US012136342B2

(12) United States Patent
Miucic et al.

(10) Patent No.: US 12,136,342 B2
(45) Date of Patent: Nov. 5, 2024

(54) PASSING ASSIST SYSTEM

(71) Applicant: LEAR CORPORATION, Southfield, MI (US)

(72) Inventors: Radovan Miucic, Beverly Hills, MI (US); Samer Rajab, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 442 days.

(21) Appl. No.: 17/501,585

(22) Filed: Oct. 14, 2021

(65) Prior Publication Data

US 2023/0117467 A1 Apr. 20, 2023

(51) Int. Cl.
*G08G 1/0968* (2006.01)
*G08G 1/0967* (2006.01)

(52) U.S. Cl.
CPC . *G08G 1/096861* (2013.01); *G08G 1/096775* (2013.01); *G08G 1/096791* (2013.01); *G08G 1/096838* (2013.01)

(58) Field of Classification Search
CPC ....... G08G 1/096861; G08G 1/096775; G08G 1/096791; G08G 1/096838
See application file for complete search history.

(56) References Cited

U.S. PATENT DOCUMENTS 9,682,712 B2 * 6/2017 Kubo .................. B60W 40/105
9,688,278 B2 * 6/2017 Harda ............. B60W 30/18163
9,783,201 B2 * 10/2017 Heinrich ................ G08G 1/167
9,836,976 B2 12/2017 Probert et al.
9,847,023 B2 * 12/2017 Huelbusch ......... G08G 1/09626
10,198,619 B1 2/2019 Zhu et al.
10,262,534 B2 4/2019 Okada et al.
10,286,913 B2 * 5/2019 Saigusa ............. B60W 30/0956
10,292,136 B2 5/2019 Rubin et al.
10,380,897 B1 * 8/2019 Patel ...................... G08G 1/162
10,672,270 B2 6/2020 Kim et al.
10,816,983 B2 10/2020 Cullinane et al.
11,661,061 B2 * 5/2023 Spika .................. B60W 40/072 701/23
2013/0271295 A1 * 10/2013 Huelbusch ............ B60W 50/14 340/907
2016/0176398 A1 * 6/2016 Prokhorov ......... B62D 15/0265 701/23
2017/0334446 A1 * 11/2017 Bosch ................... B60W 50/10
2017/0369067 A1 * 12/2017 Saigusa ................. B60W 30/16
(Continued)

OTHER PUBLICATIONS

International Search Report and Written Opinion of PCT/US22/39605 mailed Dec. 28, 2022, 16 pages.

*Primary Examiner* — Luis A Martinez Borrero
(74) *Attorney, Agent, or Firm* — BROOKS KUSHMAN P.C.

(57) ABSTRACT

A vehicle-to-everything (V2X) communication system is provided with a user interface for displaying content within a host vehicle and at least one transceiver to receive input indicative of the host vehicle turning at an upcoming intersection, and input indicative of driving conditions within a region between a remote vehicle and the upcoming intersection. A processor is programmed to determine a passing maneuver feasibility based on the driving conditions in response to the host vehicle initiating a passing maneuver relative to the remote vehicle, and to generate a driver assist message on the user interface based on the passing maneuver feasibility.

20 Claims, 3 Drawing Sheets

(56) References Cited

U.S. PATENT DOCUMENTS

| | | | | |
|---|---|---|---|---|
| 2018/0081371 | A1* | 3/2018 | Bar-Tal | G05D 1/0253 |
| 2018/0129215 | A1 | 5/2018 | Hazelton et al. | |
| 2018/0227729 | A1* | 8/2018 | Bai | G01C 21/3453 |
| 2019/0232963 | A1* | 8/2019 | Saigusa | B60W 30/10 |
| 2020/0242922 | A1* | 7/2020 | Dulberg | G08G 1/096783 |
| 2020/0284883 | A1* | 9/2020 | Ferreira | G01S 17/10 |
| 2021/0094577 | A1 | 4/2021 | Shalev-Shwartz et al. | |
| 2021/0163009 | A1* | 6/2021 | Spika | B60W 40/072 |
| 2021/0269042 | A1* | 9/2021 | Sujan | B60W 30/18163 |
| 2021/0360373 | A1* | 11/2021 | Yang | H04W 4/46 |
| 2021/0385865 | A1* | 12/2021 | Mueck | H04W 80/02 |
| 2022/0126864 | A1* | 4/2022 | Moustafa | G06T 1/0007 |
| 2022/0126878 | A1* | 4/2022 | Moustafa | G08G 1/096741 |
| 2022/0210150 | A1* | 6/2022 | Neubauer | H04W 4/022 |
| 2022/0332350 | A1* | 10/2022 | Jha | B60W 60/0017 |
| 2022/0383750 | A1* | 12/2022 | Sharma Banjade | G08G 1/005 |
| 2022/0388505 | A1* | 12/2022 | Sharma Banjade | G08G 1/096783 |
| 2022/0397415 | A1* | 12/2022 | Neishaboori | H04W 4/029 |
| 2023/0095384 | A1* | 3/2023 | Sharma Banjade | G08G 1/096725 701/301 |

* cited by examiner

PASSING ASSIST SYSTEM

TECHNICAL FIELD

One or more embodiments relate to a vehicle system and method for assisting a driver during a passing maneuver.

BACKGROUND

A vehicle may communicate with other nearby objects to collect information about its surroundings. Such communication may include vehicle-to-vehicle (V2V) communication, vehicle-to-motorcycle (V2M) communication, vehicle-to-infrastructure (V2I) communication, vehicle-to-network (V2N) communication, vehicle-to-pedestrian (V2P) communication, vehicle-to-device (V2D) communication, and vehicle-to-grid communication (V2G). This communication may be collectively referred to as vehicle-to-everything (V2X) communication. V2X communication presents an opportunity to assist the driver of the passenger vehicle by providing information beyond their field of view.

SUMMARY

In one embodiment, a vehicle-to-everything (V2X) communication system is provided with a user interface for displaying content within a host vehicle and at least one transceiver to receive input indicative of: the host vehicle turning at an upcoming intersection and driving conditions within a region between a remote vehicle and the upcoming intersection. A processor is programmed to: determine a passing maneuver feasibility based on the driving conditions in response to the host vehicle initiating a passing maneuver relative to the remote vehicle, and generate a driver assist message on the user interface based on the passing maneuver feasibility.

In another embodiment, a driver assist system is provided with at least one transceiver for being positioned in a host vehicle to receive input indicative of: the host vehicle turning at an upcoming intersection; and driving conditions within a region between a remote vehicle and the upcoming intersection. A processor is programmed to, in response to the host vehicle initiating a passing maneuver of the remote vehicle, determine at least one of a passing maneuver feasibility and a confidence level based on the driving conditions, and to generate a driver assist message based on the passing maneuver feasibility or the confidence level.

In yet another embodiment, a method is provided for assisting a driver of a host vehicle. Input is received that is indicative of the host vehicle turning at an upcoming intersection, and of driving conditions within a region between a remote vehicle and the upcoming intersection. At least one of a passing maneuver feasibility and a confidence level is determined based on the driving conditions, in response to the host vehicle initiating a passing maneuver of the remote vehicle within the region. A driver assist message is generated based on the passing maneuver feasibility or the confidence level.

BRIEF DESCRIPTION OF THE DRAWINGS

For a more complete understanding of the present disclosure, and for further features and advantages thereof, reference is now made to the following description taken in conjunction with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
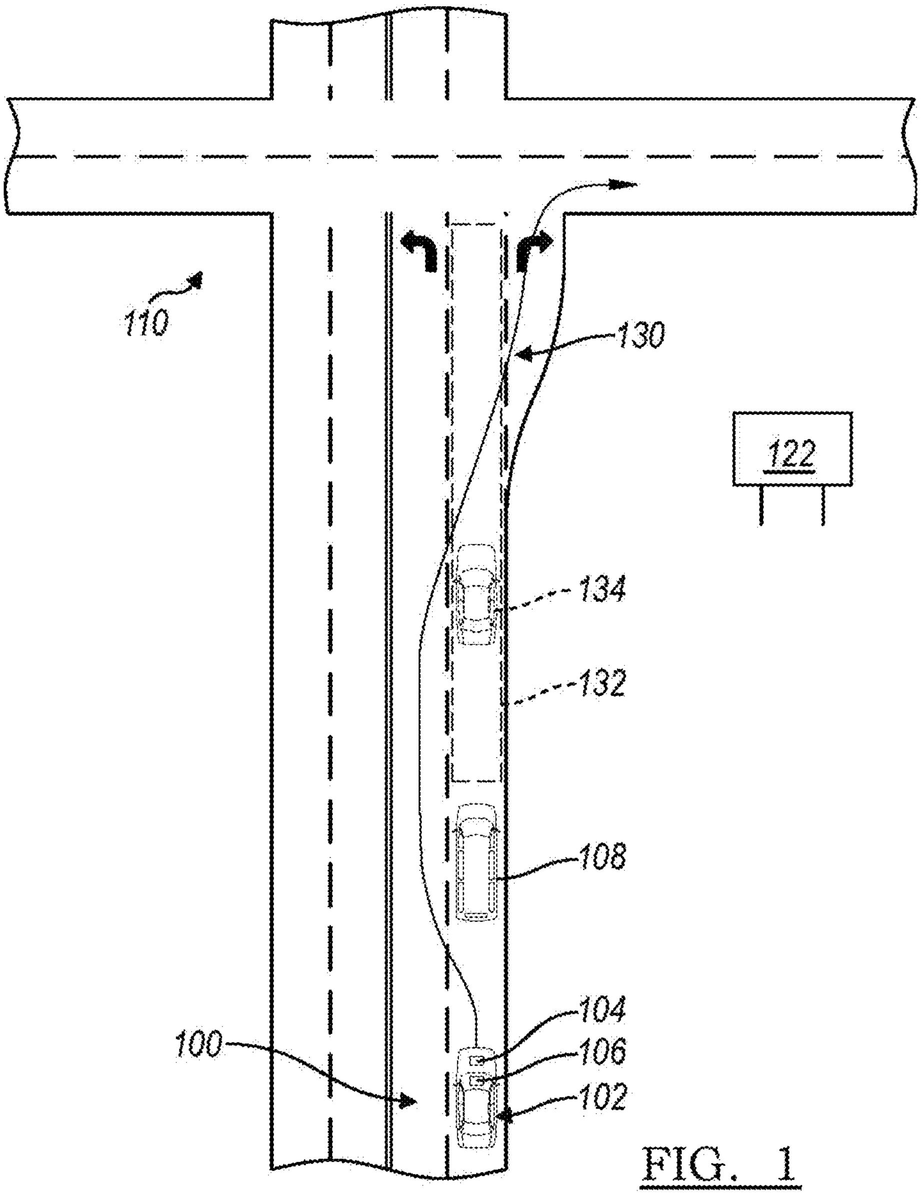
FIG. 1 is a top schematic view of a host vehicle with a vehicle system for assisting a driver during a passing maneuver.

With reference to FIG. 1, a vehicle system for assisting a driver during a passing maneuver is illustrated in accordance with one or more embodiments and generally referenced by numeral 100. The vehicle system 100 is depicted within a host vehicle (HV) 102. The vehicle system 100 includes a controller 104 and a user interface 106. The HV 102 is illustrated travelling behind a remote vehicle (RV) 108 as both vehicles approach an intersection 110. The vehicle system 100 monitors the position of the RV 108 relative to the intersection 110, and other vehicle inputs, to evaluate driving conditions for the HV 102 to pass, or overtake, the RV 108 before the intersection 110. The vehicle system 100 assists the driver by communicating messages based on these driving conditions before the driver performs the passing maneuver.

Figure 2:
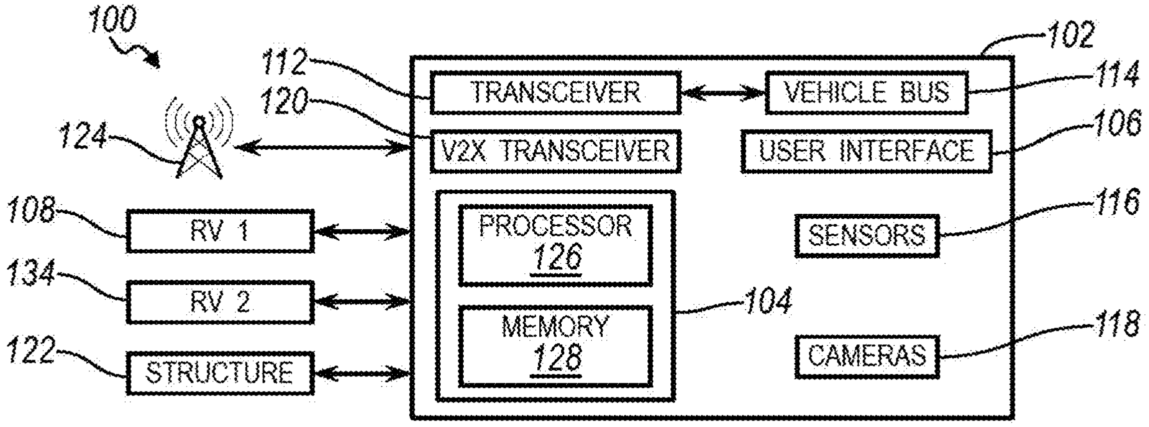
FIG. 2 is a detailed schematic view illustrating vehicle to everything (V2X) communication between the vehicle system and other objects.

Referring to FIG. 2, the vehicle system 100 includes a transceiver 112 that is connected to the controller 104 for communicating with other systems of the HV 102. The transceiver 112 may receive input that is indicative of present operating conditions of various systems of the HV 102, e.g., an engine, transmission, navigation system, brake systems, etc. (not shown). Each input may be a signal transmitted directly between the transceiver 112 and the corresponding vehicle system, or indirectly as data over a vehicle communication bus 114, e.g., a CAN bus. For example, the transceiver 112 may receive input such as vehicle speed, turn signal status, brake position, vehicle position, and steering angle over the vehicle communication bus 114.

The transceiver 112 may also receive input that is indicative of the environment external to the HV 102. For example, the HV 102 may include sensors 116, e.g., light detection and ranging (Lidar) sensors, for determining the location of objects external to the HV 102. The HV 102 may also include one or more cameras 118 for monitoring the external environment.

The vehicle system 100 also includes a V2X transceiver 120 that is connected to the controller 104 for communicating with other vehicles and structures. For example, the vehicle system 100 of the HV 102 may use the V2X transceiver 120 for communicating directly with the RV 108 by vehicle-to-vehicle (V2V) communication, a sign 122 by vehicle-to-infrastructure (V2I) communication, or a motorcycle (not shown) by vehicle-to-motorcycle (V2M) communication.

The vehicle system 100 may use WLAN technology to form a vehicular ad-hoc network as two V2X devices come within each other's range. This technology is referred to as Dedicated Short-Range Communication (DSRC), which uses the underlying radio communication provided by IEE 802.11p. The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Alternatively, the vehicle system 100 may communicate with another V2X device using Cellular V2X (C-V2X), Long Term Evolution V2X (LTE-V2X), or New Radio Cellular V2X (NR C-V2X), each of which may use a cellular network 124.

Each V2X device may provide information indictive of its own status to other V2X devices. Connected vehicle systems and V2V and V2I applications using DSRC rely on the Basic Safety Message (BSM), which is one of the messages defined in the Society of Automotive standard J 2735, V2X Communications Message Set Dictionary, July 2020. The BSM is broadcast from vehicles over the 5.9 GHz DSRC band, and the transmission range is on the order of 1,000 meters. The BSM consists of two parts. BSM Part 1 contains core data elements, including vehicle position, heading, speed, acceleration, steering wheel angle, and vehicle classification (e.g., passenger vehicle or motorcycle) and is transmitted at an adjustable rate of about 10 times per second. BSM Part 2 contains a variable set of data elements drawn from an extensive list of optional elements. They are selected based on event triggers (e.g., ABS activated) and are added to Part 1 and sent as part of the BSM message, but are transmitted less frequently in order to conserve bandwidth. The BSM message includes only current snapshots (with the exception of path data which is itself limited to a few second's worth of past history data). As will be discussed in further detail herein, it is understood that any other type of V2X messages can be implemented, and that V2X messages can describe any collection or packet of information and/or data that can be transmitted between V2X communication devices. Further, these messages may be in different formats and include other information.

Each V2X device may also provide information indictive of the status of another vehicle or object in its proximity. For example, the sign 122 may provide information about the RV 108, e.g., its speed and location, to the HV 102.

Although the controller 104 is described as a single controller, it may contain multiple controllers, or may be embodied as software code within one or more other controllers. The controller 104 includes a processing unit, or processor 126, that may include any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. The controller 104 also includes memory 128, or non-transitory computer-readable storage medium, that is capable of executing instructions of a software program. The memory 128 may be, but is not limited to, an electronic storage device, a magnetic storage device, an optical storage device, an electromagnetic storage device, a semi-conductor storage device, or any suitable combination thereof. In general, the processor 126 receives instructions, for example from the memory 128, a computer-readable medium, or the like, and executes the instructions. The controller 104, also includes predetermined data, or "look up tables" that are stored within memory, according to one or more embodiments.

FIG. 1 illustrates a driving scenario in which the HV 102 is approaching the intersection 110 behind a slow-moving RV 108 and initiates a passing maneuver to overtake the RV 108 before the intersection 110. The vehicle system 100 may determine that the HV 102 is initiating a passing maneuver to overtake the RV 108 based on multiple vehicle inputs. For example, the vehicle system 100 may infer that the driver of the HV 102 will turn right at the intersection 110, e.g., based on a route 130 provided by the navigation system; and that the driver of the HV 102 intends to pass, or overtake, the RV 108 before the intersection 110 based on a left turn signal or image data from the camera 118 indicating that the HV 102 is exiting its lane.

Figure 3:
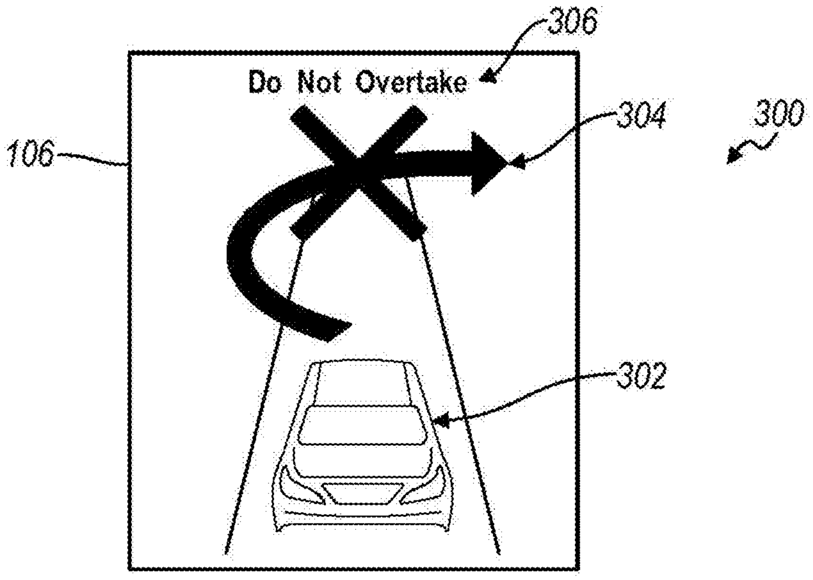
FIG. 3 is a front elevation view of a user interface, illustrating a first message discouraging a passing maneuver.
Figure 4:
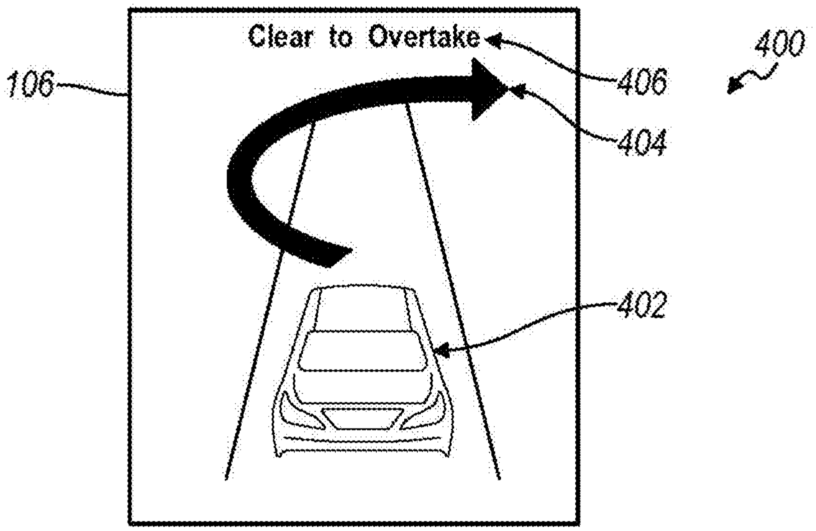
FIG. 4 is a front elevation view of the user interface, illustrating a second message approving a passing maneuver.

With reference to FIGS. 1, 3, and 4, the vehicle system 100 may analyze multiple driving conditions to determine if there is sufficient clearance to perform the passing maneuver before the intersection 110, and then communicate binary information, e.g., "Clear to go" or "Do Not Overtake," to assist the driver. The driving conditions may include information of any vehicles or objects in an overtake region 132 between the remote vehicle 108 and the intersection 110. The vehicle system 100 may determine that there is insufficient clearance to perform the passing maneuver based on V2X information, e.g., because a second remote vehicle 134 is in the overtake region 132. Accordingly, as shown in FIG. 3, the vehicle system 100 may provide a driver assist message 300 on the user interface 106 with an image of the host vehicle 302, an image of the route 304 crossed out, and/or text 306 discouraging the driver from performing the passing maneuver, e.g., "Do Not Overtake."

Alternatively, the vehicle system 100 may determine that there is sufficient clearance to perform the passing maneuver, e.g., because there are no vehicles or objects in the overtake region 132. Accordingly, as shown in FIG. 4, the vehicle system 100 may provide a driver assist message 400 on the user interface 106 with an image of the host vehicle 402, an image of the route 404 and/or text 406 informing the driver that there is sufficient clearance to perform the passing maneuver, e.g., "Clear to Overtake."

Figure 5:
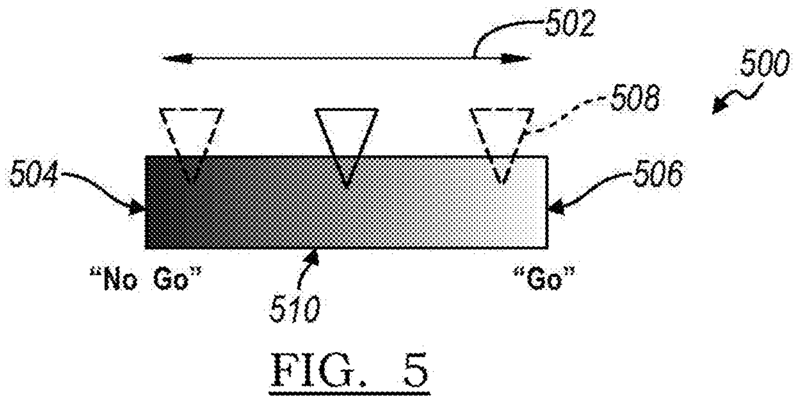
FIG. 5 is a front elevation view of the user interface, illustrating a scale representing a confidence level of successfully performing the passing maneuver.

Referring to FIG. 5, in one or more embodiments the vehicle system 100 may provide variable "go" or "no go" information to the driver, in addition to, or as an alternative to the binary messages of FIGS. 3 and 4. The vehicle system 100 may provide a variable driver assist message 500 on the user interface, with a scale 502 extending between a "No Go" region 504 and a "Go" region 506. The variable driver assist message 500 may include an indicator 508 that is positioned along the scale 502 based on the driving conditions. For example, the vehicle system 100 may position the indicator 508 in the "No Go" region 504 when the second remote vehicle 134 is present in the overtake region 132; and position the indicator 508 in the "Go" region 506 when no vehicles or objects are present in the overtake region 132. The vehicle system 100 may adjust the indicator 508 position based on other driving conditions, such as weather conditions, or rules and regulations. For example, in one embodiment, the vehicle system 100 may determine that, although there may not be remote vehicle in the overtake region 132, there is inclement weather, e.g., rain or snow, and therefore it adjusts the indicator 508 to an intermediate region 510 on the scale 502. In one or more embodiments, the variable driver assist message 500 includes color to emphasize the confidence level. For example, the variable driver assist message 500 may be red in the "No Go" region 504, green in the "Go" region 506, and yellow in the intermediate region 510, as generally represented by the shading in FIG. 5.

Figure 6:
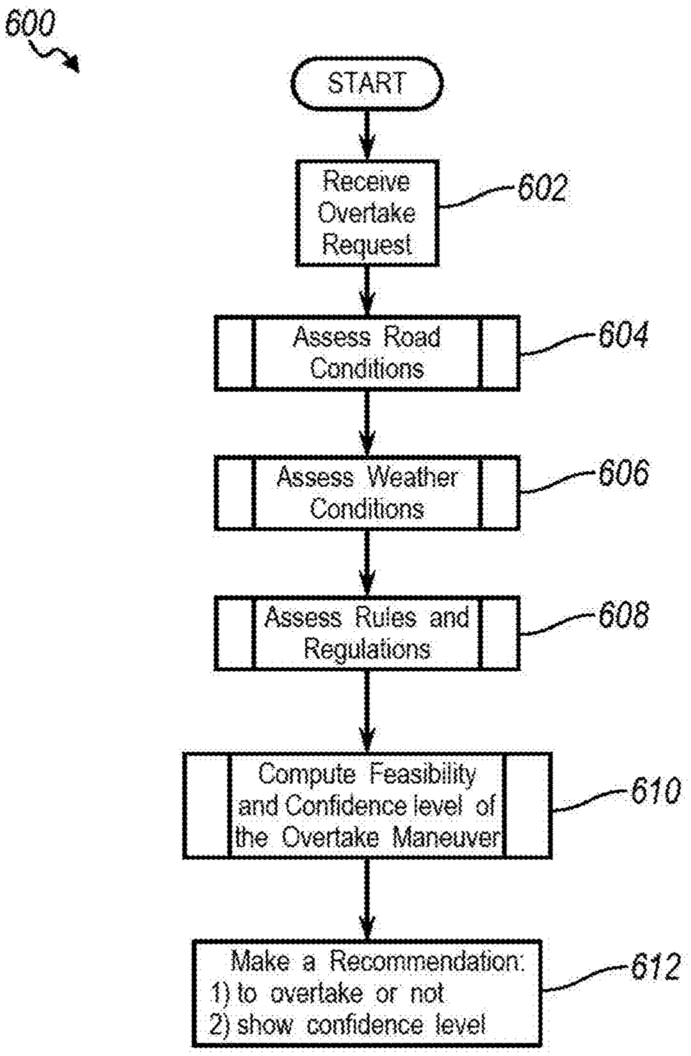
FIG. 6 is a flow chart illustrating a method for assisting a driver during a passing maneuver.

With reference to FIG. 6, a flow chart depicting a method for monitoring remote vehicles during a passing maneuver is illustrated in accordance with one or more embodiments and is generally referenced by numeral 600. The method 600 is implemented using software code that is executed by the controller 104 and contained within memory according to one or more embodiments. While the flowchart is illustrated with a number of sequential steps, one or more steps may be omitted and/or executed in another manner without deviating from the scope and contemplation of the present disclosure.

At step 602, the vehicle system 100 receives an overtake request that indicates that the driver of the host vehicle 102 intends to pass a remote vehicle 108 before an intersection 110. The vehicle system 100 may infer that the driver of the HV 102 will turn right at the intersection 110, e.g., based on the route 130 provided by the navigation system. The vehicle system 100 may determine that the driver intends to pass, or overtake, the RV 108 and enter the overtake region 132 before the intersection 110. The vehicle system 100 may make this determination based on a turn signal status that is opposite the direction of the turn, e.g., a left turn signal and a right turn, or based data from the sensor 116 or camera 118. Then, at steps 604-608, the vehicle system 100 assess, or evaluates, multiple driving conditions.

At step 604, the vehicle system 100 assesses road conditions, such as the presence of objects in the overtake region 132, and the condition of the road. The vehicle system 100 may determine the presence of stationary or moving objects in the overtake region 132 based on input from the sensors 116, the cameras 118, and/or V2X communication. For example, the vehicle system 100 may determine the presence of a moving vehicle or animal, including its speed and location relative to the host vehicle 102 based on the input. The vehicle system 100 may also determine the presence of a stationary vehicle, and any emergency vehicles or pedestrians proximate the stationary vehicle based on the input. The vehicle system 100 may assess the condition of the road, e.g., construction and potholes, from input from the sensors 116, the cameras 118, V2X communication, and the cellular network 124.

At step 606, the vehicle system 100 assesses weather conditions, such as ambient temperature, precipitation, wind, fog, etc. The vehicle system 100 may assess weather conditions from input from the sensors 116, the cameras 118, V2X communication, and the cellular network 124, and vehicle data, such as windshield wiper status.

At step 608, the vehicle system 100 assesses rules and regulations, such as speed limits, traffic signs, and traffic light status. The vehicle system 100 may assess rules and regulations based on input from the sensors 116, the cameras 118, V2X communication, and the cellular network 124.

At step 610, the vehicle system 100 determines the feasibility and/or confidence level of the overtake passing maneuver based on the driving conditions assessed in steps 604-608. Then at step 612, the vehicle system 100 provides a driver assist message to the driver that indicates the feasibility and/or confidence level of the overtake passing maneuver, e.g., the messages shown in FIGS. 3-5.

The vehicle system 100 may provide a driver assist message discouraging the driver from performing the passing maneuver, as shown in FIG. 3, in response to various input such as: road conditions indicative of a vehicle or an animal in the region between the remote vehicle and the upcoming intersection; weather conditions indicative of precipitation in the region between the remote vehicle and the upcoming intersection; and a speed limit, and a current speed of the HV 102 exceeding the speed limit. The vehicle system 100 assists the driver of the host vehicle 102 by providing information beyond their field of view during a passing maneuver before an intersection.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle-to-everything (V2X) communication system, comprising:
- a user interface for displaying content within a host vehicle;
- at least one transceiver configured to receive input indicative of:
  - the host vehicle turning at an upcoming intersection, and
  - driving conditions within an overtake region between a remote vehicle and the upcoming intersection; and
- a processor programmed to:
  - determine a passing maneuver feasibility and a confidence level based on the driving conditions in response to determining that the host vehicle is initiating a passing maneuver relative to the remote vehicle based on at least one of a turn signal status, camera data, and sensor data; and
  - generate a driver assist message on the user interface based on the passing maneuver feasibility and the confidence level, wherein the driver assist message comprises at least one of:
    - a host vehicle image, a route image, and text approving or discouraging the passing maneuver, and
    - a scale and an indicator positioned along the scale corresponding to the confidence level.

2. The V2X communication system of claim 1, wherein the processor is further programmed to generate the driver assist message in response to:
- the host vehicle turning in a first direction at the upcoming intersection; and
- the host vehicle initiating the passing maneuver by exiting a driving lane in a second direction opposite the first direction.

3. The V2X communication system of claim 2, wherein the driving conditions comprise road conditions, and wherein the processor is further programmed to generate a first driver assist message discouraging the passing maneuver in response to the road conditions indicating a vehicle or an animal is present in the overtake region between the remote vehicle and the upcoming intersection.

4. The V2X communication system of claim 3, wherein the at least one transceiver is adapted to receive the road conditions from one of the remote vehicle by vehicle-to-vehicle (V2V) communication or from infrastructure by vehicle-to-infrastructure (V2I) communication.

5. The V2X communication system of claim 2, wherein the driving conditions comprise weather conditions, and wherein the processor is further programmed to generate a first driver assist message discouraging the passing maneuver in response to the weather conditions indicating precipitation in the overtake region between the remote vehicle and the upcoming intersection.

6. The V2X communication system of claim 5, wherein the at least one transceiver is adapted to receive the weather conditions from one of the remote vehicle by vehicle-to-vehicle (V2V) communication or from infrastructure by vehicle-to-infrastructure (V2I) communication.

7. The V2X communication system of claim 2, wherein the driving conditions comprise rules and regulations, and wherein the processor is further programmed to generate a first driver assist message on the user interface discouraging the passing maneuver in response to a speed of the host vehicle exceeding a speed limit.

8. The V2X communication system of claim 1, wherein the host vehicle monitors a position of the remote vehicle relative to the upcoming intersection.

9. The V2X communication system of claim 1, wherein the processor is further programmed to:

detect a presence of an object in the overtake region based on the sensor data, the camera data, and an input received from V2X communication; and determine a speed and a location of the object relative to the host vehicle based on the sensor data, the camera data, and the input from the V2X communication.

10. The V2X communication system of claim 1, wherein the processor is further programmed to position the indicator along the scale in:

a first region when a vehicle or an object is present in the overtake region, and a second region when no vehicle or object is present in the overtake region.

11. The V2X communication system of claim 1, wherein the driver assist message comprises color for indicating the confidence level.

12. A driver assist system, comprising:

at least one transceiver, positioned in a host vehicle, configured to receive input indicative of:

the host vehicle turning at an upcoming intersection, and driving conditions within an overtake region between a remote vehicle and the upcoming intersection; and a processor programmed to:

determine, in response to determining that the host vehicle is initiating a passing maneuver of the remote vehicle based on at least one of a turn signal status, camera data, and sensor data, at least one of a passing maneuver feasibility and a confidence level based on the driving conditions, and generate a driver assist message based on the passing maneuver feasibility or the confidence level, wherein the driver assist message comprises at least one of:

a host vehicle image, a route image, and text approving or discouraging the passing maneuver, and a scale and an indicator positioned along the scale corresponding to the confidence level.

13. The driver assist system of claim 12, wherein the processor is further programmed to:

generate the driver assist message in response to:

the host vehicle turning in a first direction at the upcoming intersection, and the host vehicle initiating the passing maneuver by exiting a driving lane in a second direction opposite the first direction.

14. The driver assist system of claim 13, wherein the driving conditions comprise road conditions, and wherein the processor is further programmed to generate a first driver assist message discouraging the passing maneuver in response to the road conditions, received by vehicle-to-everything (V2X) communication, indicating a vehicle or an animal in the overtake region between the remote vehicle and the upcoming intersection.

15. The driver assist system of claim 13, wherein the driving conditions comprise weather conditions, and wherein the processor is further programmed to generate a first driver assist message discouraging the passing maneuver in response to the weather conditions received by vehicle-to-everything (V2X) communication, indicating precipitation in the overtake region between the remote vehicle and the upcoming intersection.

16. The driver assist system of claim 13, wherein the driving conditions comprise rules and regulations, and wherein the processor is further programmed to generate a first driver assist message discouraging the passing maneuver in response to a speed of the host vehicle exceeding a speed limit.

17. A method for assisting a driver of a host vehicle, comprising:

receiving input indicative of the host vehicle turning at an upcoming intersection, and of driving conditions within an overtake region between a remote vehicle and the upcoming intersection;

determining at least one of a passing maneuver feasibility and a confidence level based on the driving conditions in response to determining that the host vehicle is initiating a passing maneuver of the remote vehicle within the overtake region based on at least one of a turn signal status, camera data, and sensor data; and generating a driver assist message based on the passing maneuver feasibility or the confidence level, wherein the driver assist message comprises at least one of:

a host vehicle image, a route image, and text approving or discouraging the passing maneuver; and a scale and an indicator positioned along the scale corresponding to the confidence level.

18. The method of claim 17, further comprising:

generating the driver assist message based on the passing maneuver feasibility or the confidence level in response to:

the host vehicle turning in a first direction at the upcoming intersection, and the host vehicle initiating the passing maneuver by exiting a driving lane in a second direction opposite the first direction.

19. The method of claim 17, further comprising generating a first driver assist message discouraging the passing maneuver in response to driving conditions indicating a vehicle or an animal in the overtake region between the remote vehicle and the upcoming intersection.

20. The method of claim 17, further comprising generating a first driver assist message discouraging the passing maneuver in response to driving conditions indicating: precipitation in the overtake region between the remote vehicle and the upcoming intersection, or a speed of the host vehicle exceeding a speed limit.

* * * * *